(12) United States Patent
Schwab

(10) Patent No.: US 7,677,779 B2
(45) Date of Patent: Mar. 16, 2010

(54) VEHICLE LAMP COLLAPSIBLE CLOSEOUT

(75) Inventor: Leo F. Schwab, Fraser, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 219 days.

(21) Appl. No.: 11/681,222

(22) Filed: Mar. 2, 2007

(65) Prior Publication Data

US 2008/0212335 A1 Sep. 4, 2008

(51) Int. Cl.
*B60Q 1/00* (2006.01)

(52) U.S. Cl. ............... 362/546; 362/549; 362/457; 362/458; 362/267; 362/548; 362/507; 362/459; 296/187.09; 296/193.1

(58) Field of Classification Search ............... 362/549, 362/457, 458, 267, 548, 459, 546, 507; 296/187.09, 296/193.1
See application file for complete search history.

(56) References Cited

U.S. PATENT DOCUMENTS

| 6,398,396 | B1 * | 6/2002 | Nestell et al. | 362/520 |
| 6,454,449 | B2 * | 9/2002 | Nestell et al. | 362/520 |
| 2006/0082189 | A1 * | 4/2006 | Sultan et al. | 296/146.9 |

\* cited by examiner

*Primary Examiner*—Sandra L O'Shea
*Assistant Examiner*—Jessica L McMillan

(57) ABSTRACT

A collapsible closeout for a gap between a vehicle lamp and closure, and particularly well suited for a gap between a headlamp and a hood, is disclosed. The closeout may include a base mounted to a lamp housing, a closeout wall extending from the base, and a contact flange extending under the hood and having a free end extending toward a headlamp lens. The closeout may also include first support ribs extending from the closeout wall toward the headlamp and opposed second support ribs extending from the closeout wall.

20 Claims, 3 Drawing Sheets

VEHICLE LAMP COLLAPSIBLE CLOSEOUT

BACKGROUND OF THE INVENTION

The present application relates generally to a vehicle lamp assembly and to a closeout for a vehicle lamp assembly.

A closeout is a member, made of an elastic material, that extends around the perimeter or portion of the perimeter of a vehicle lamp, and may be used to close the gap between the lamp and adjacent closures. For example, closeouts are often used between a headlamp assembly and a vehicle hood. There are several common types, including lip seal closeouts, cantilever-type sealing lips, and bulb designs. Lip seals work well when a leading edge of the hood shingles over top of a portion of the headlamp lens to fill a vertical gap, and bulb seals may be used for such arrangements. However, these two types are not particularly desirable for hood-to-lamp designs where there is a fore-aft gap between the leading edge of the hood and the rear of the headlamp lens.

In the past, cantilever-type closeouts have been used to bridge large fore-aft gaps (six to eight millimeters) between the hood and the headlamp. For appearance reasons, it is desirable to reduce the gaps between the body panels, and this includes the gaps between the headlamp and its surrounding body parts. Such a fore-aft gap may be, for example, only two to four millimeters (including variation). Even with reduced gaps, a closeout is still desirable in a fore-aft gap between the hood and the headlamp in order to maintain an acceptable appearance. Lens overhangs (shark fins) have been employed to allow for the use of a cantilever-type closeout with small fore-aft gaps.

FIG. 6 illustrates a prior art cantilever-type headlamp closeout 200 and headlamp assembly 202, with a hood 203 in an over-travel position. A headlamp housing 204 is secured to and supports a headlamp lens 206. The lens 206 includes a forward portion 208 that has an overhang (shark fin) 210 extending from its aft end, and a rear portion 212 upon which the cantilever-type (lip seal) closeout 200 is supported. The closeout 200 is made of a flexible elastic material. It includes a base portion 216 that is positioned next to the rear portion 212 under the shark fin 210, and a cantilever portion 218 that extends out under the hood 203. The cantilever portion 218 closes off the fore-aft gap between the shark fin 210 and a leading edge 220 of the hood 203. The flexibility of the cantilever portion 218 allows it to bend downward (as seen in FIG. 6) when the hood 203 over-travels and spring back when the hood 203 is in its nominal position. The shark fin lens overhang 210 allows room to package the base portion 216 of the cantilever style closeout 200 while not interfering with the cantilever portion 218 bending down under hood over-travel conditions—even when the hood 203, during assembly, is mounted in its forward most position due to part and build variation.

While the shark fin 210 on the lens 206 allows for the use of the cantilever-type closeout 200 with a small fore-aft gap between the lens 206 and hood leading edge 220, the shark fin lens flange extending aft of the main portion of the lens does not create a desirable aesthetic appearance and so is not desirable. Eliminating the shark fin 210 while maintaining the small fore-aft gap, however, does not allow room to prevent the base portion 216 from interfering with the cantilever portion 218 if variation places the hood 203 in its most forward position. In such a situation, rather than the cantilever portion 218 bending, the base portion 216 would be crushed down against the lens 206, imparting undesirable forces directly into the lens 206. And, as a matter of fact, even with a shark fin, loads may still be imparted from the hood 203, through the closeout 200 and into the lens 206 since the base portion 216 is positioned directly on the lens 206. These forces imparted to the lens 206 may induce stresses in a glue joint 224 between the lens 206 and housing 204, which is undesirable. Consequently, this cantilever-type headlamp closeout 200 is less than optimal for achieving the desired functional and aesthetic characteristics in the headlamp to hood gap.

Moreover, for many closeouts, the mounting of the closeout is accomplished with adhesives. But adhesive attachment can be relatively high in cost and may present issues related to placement repeatability.

Thus, it is desirable to provide a closeout that will fill a small fore-aft gap between a headlamp lens and hood leading edge, without requiring the use of a shark fin flange on the lens, in order to meet aesthetic requirements. Also, it is desirable that such a closeout will avoid imparting loads directly to the lens, and will be relatively easy to mount in the proper location.

SUMMARY OF THE INVENTION

An embodiment contemplates a collapsible closeout for a vehicle lamp assembly having a lamp housing. The collapsible closeout may comprise a base, a closeout wall and a closeout contact flange. The base is adapted to be mounted to the lamp housing. The closeout wall may extend from the base at an angle other than normal to the base. The closeout contact flange has a fixed end supported by the closeout wall, an opposed free end adapted to extend away from a closure toward the lamp assembly, and a contact surface extending between the fixed end and the free end and adapted to extend parallel to and adjacent with an inner surface of the closure when the closure is in a closed position.

An embodiment contemplates a collapsible closeout for a vehicle lamp assembly having a lamp housing. The collapsible closeout may comprise a base adapted to be mounted to the lamp housing; a closeout wall having a lower wall portion extending from the base and an upper wall portion extending in a first direction that is not parallel to a second direction the lower wall portion extends; and a closeout contact flange having a fixed end supported by the upper wall portion, an opposed free end adapted to extend away from a closure toward the lamp assembly, and a contact surface extending between the fixed end and the free end and adapted to extend parallel to and adjacent with an inner surface of the closure when the closure is in a closed position.

An embodiment contemplates a headlamp assembly for a vehicle having a hood with a leading edge. The headlamp assembly may include a headlamp housing, a headlamp lens, and a closeout. The headlamp housing may have a closeout mounting flange. The headlamp lens may be mounted to the headlamp housing and have a forward portion, a rearward portion and an upper edge between the forward portion and the rearward portion, with the upper edge and the leading edge of the hood defining a fore-aft gap therebetween. The closeout may include a base mounted to the closeout mounting flange; a closeout wall extending from the base; a hood contact flange having a fixed end supported by the upper wall portion, an opposed free end extending away from the hood toward the lamp assembly, and a contact surface extending between the fixed end and the free end and parallel to and adjacent with an inner surface of the hood when the hood is in a closed position; and a plurality of rear support ribs extending between the base and the closeout wall, and extending outward from the closeout wall away from the headlamp lens.

An advantage of an embodiment is that the fore-aft gap between the lens and hood leading edge may be maintained relatively small, with the closeout filling the visual sight line in the gap and allowing for hood over-travel, all while not requiring the use of a shark fin lens flange. The closeout is collapsible when the hood over-travels, without getting pinched between the hood and headlamp assembly, and will return to its normal design state when the hood returns to its nominal built condition. The small fore-aft gap and elimination of the shark fin flange improves the aesthetic appearance of the headlamp to hood gap.

An advantage of an embodiment is that the closeout imparts loads induced from hood over-travel directly into the lamp housing rather than into the lens. This helps to minimize loads into lens-to-housing glue joints when the closeout is depressed due to hood over-travel.

An advantage of an embodiment is that the closeout closes off the visual sight line in the gap between the headlamp lens and the hood while being able to remain below the surface, minimizing the potential for wax and dirt buildup on the closeout.

An advantage of an embodiment is that the closeout may absorb some of the energy induced during a hood over-travel condition. Such energy absorption may allow the closeout to act as a secondary hood bumper, and may also allow for improved packaging efficiency for a lens-to-housing interface.

DETAILED DESCRIPTION

Figure 1:
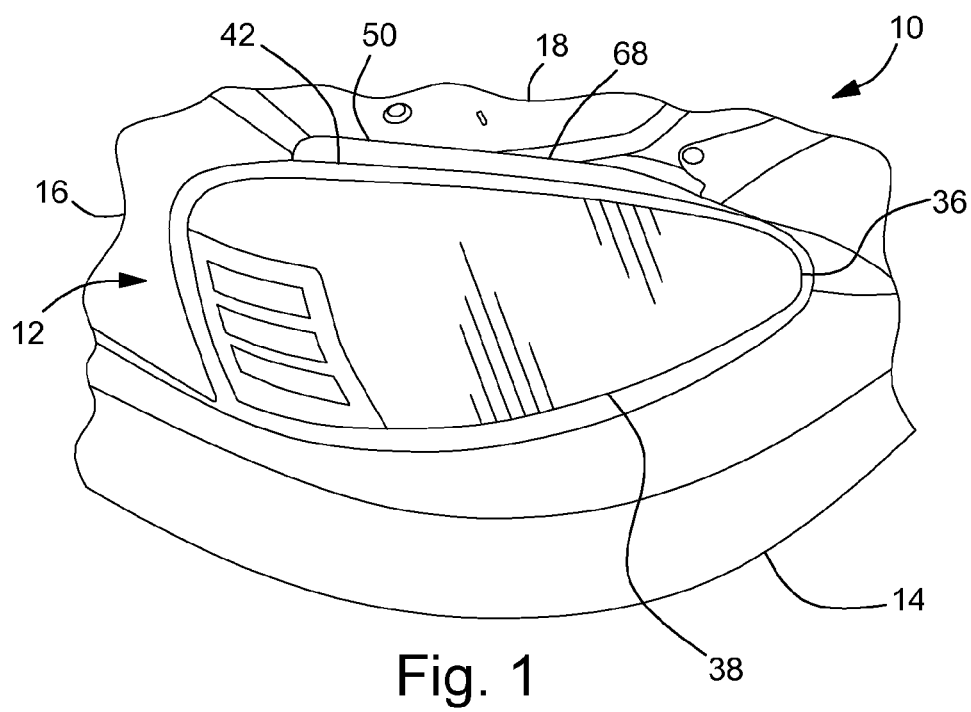
FIG. 1 is a perspective view of a headlamp assembly and adjacent vehicle structure.
Figure 2:
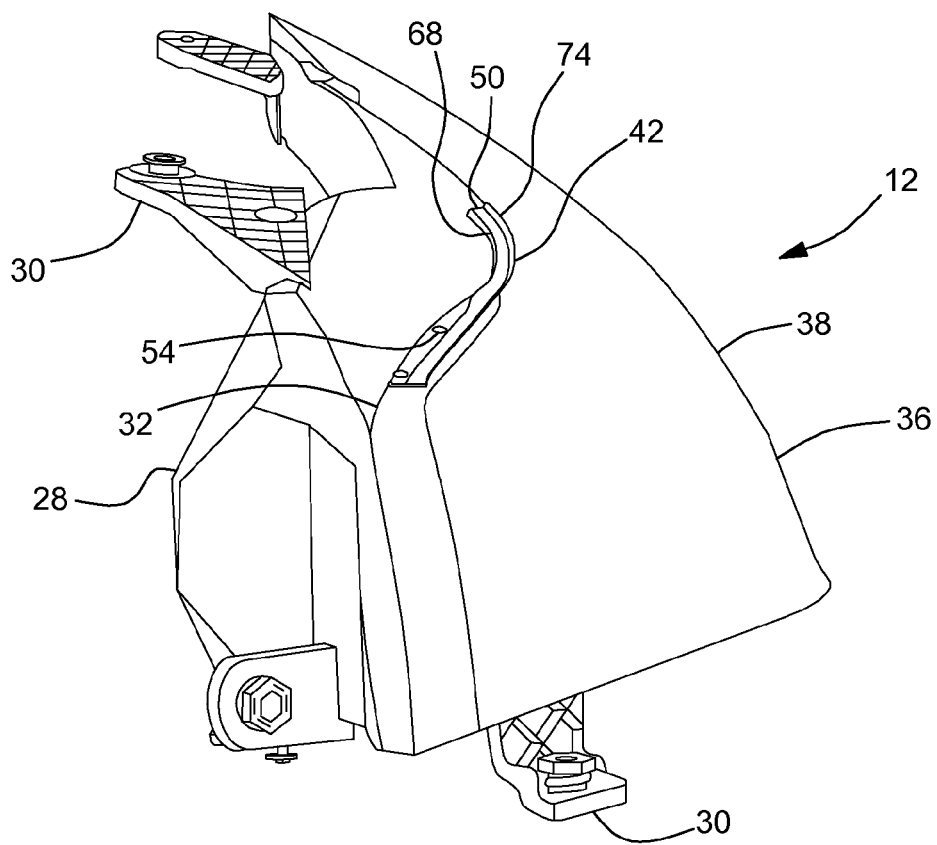
FIG. 2 is a perspective view of a headlamp assembly and closeout.
Figure 3:
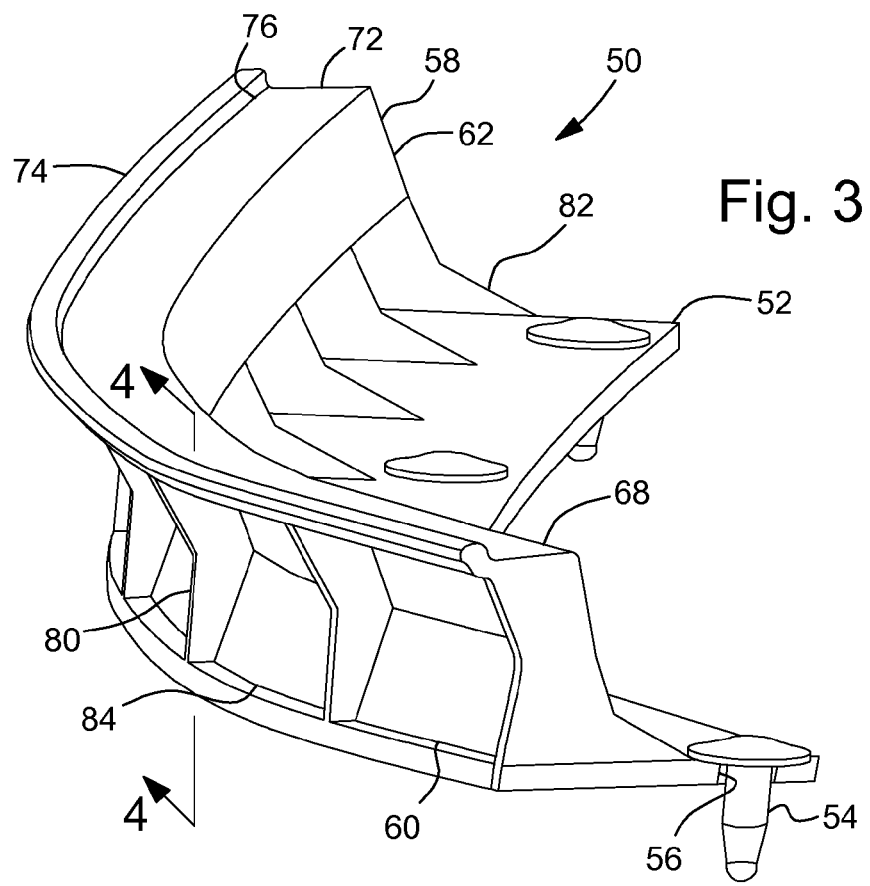
FIG. 3 is a perspective view of a headlamp closeout.
Figure 4:
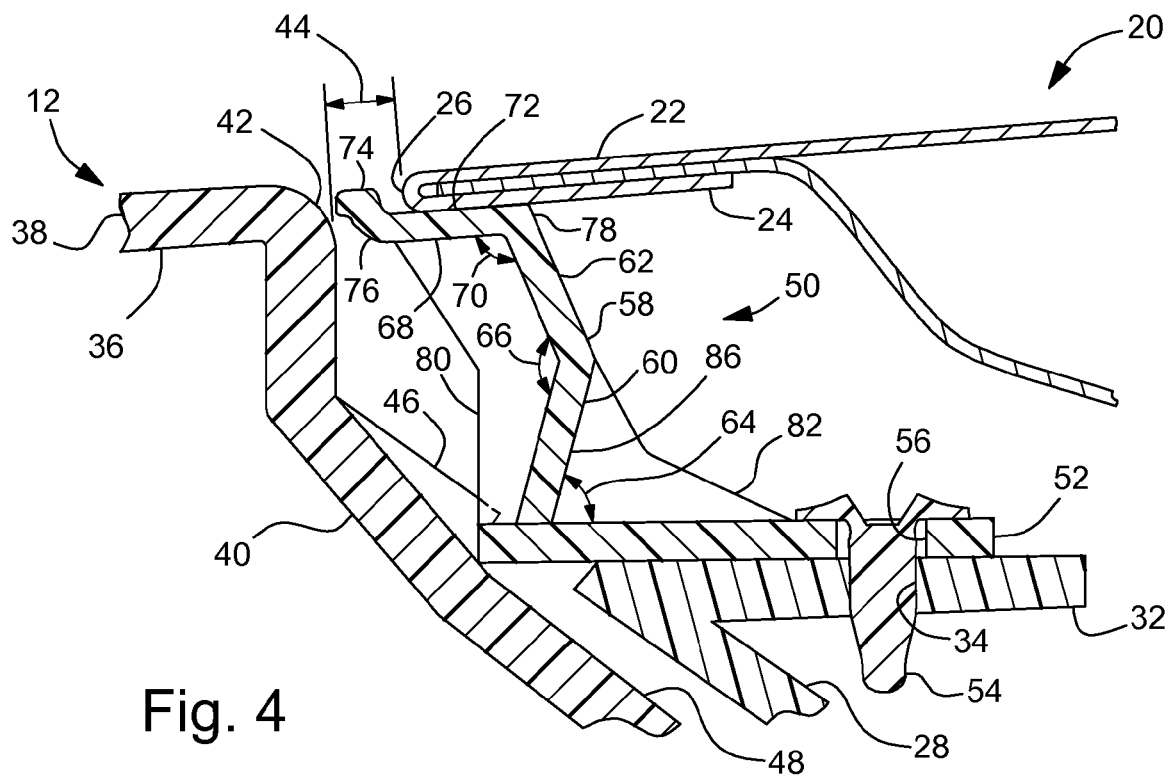
FIG. 4 is a side sectional view of a portion of a vehicle hood, headlamp closeout and headlamp assembly viewed in the direction of arrows 4-4 in FIG. 3, with the hood and headlamp closeout in a nominal hood closed position.
Figure 5:
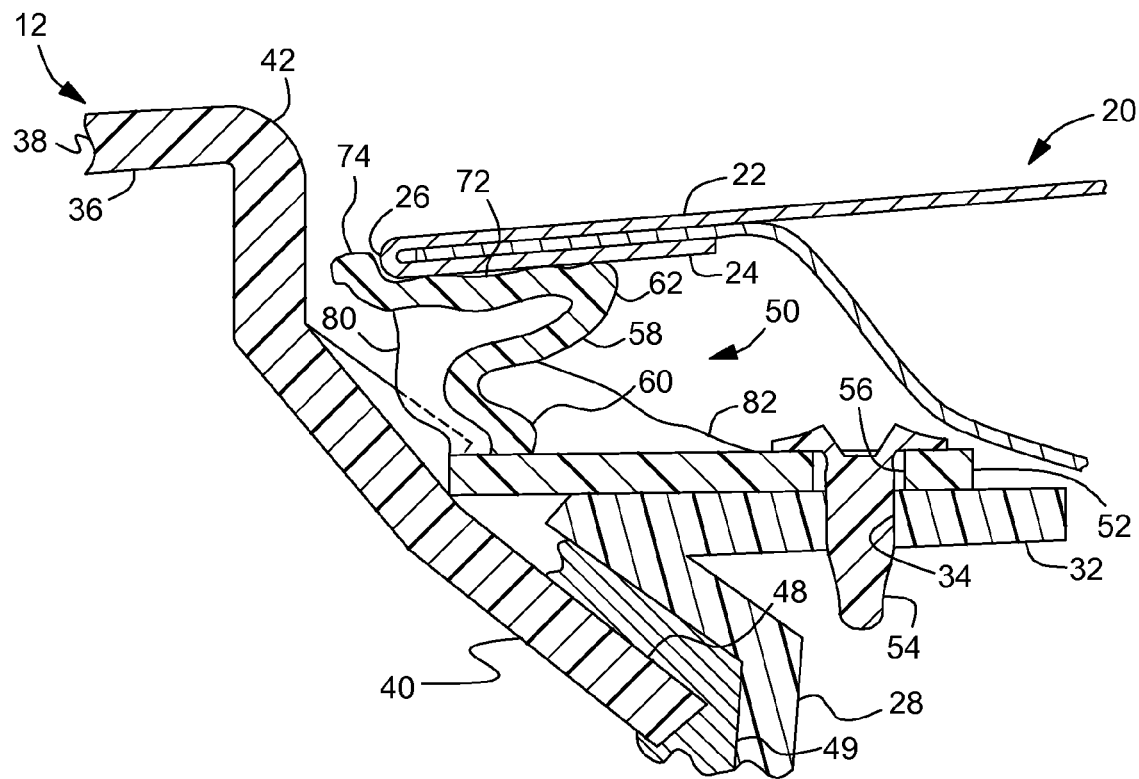
FIG. 5 is a view similar to FIG. 4, but illustrating the hood in an over-travel position and a partially schematic representation of the headlamp closeout in a buckled position due to the hood over-travel.
Figure 6:
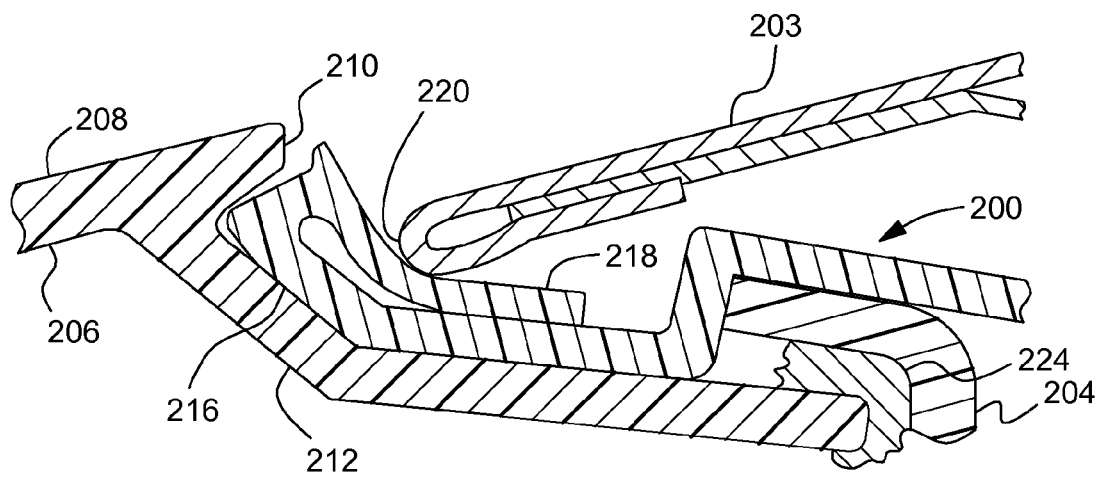
FIG. 6 is view similar to FIG. 5, but illustrating a prior art headlamp closeout and headlamp assembly, with the hood in an over-travel position.

FIGS. 1-5 illustrate a portion of a vehicle 10 including a headlamp assembly 12 surrounded by a bumper 14, fender 16 and body structure 18 that is covered by a closure, in this case a hood 20 (shown in FIGS. 4 and 5). The hood 20 has an outer surface 22, an inner surface 24, and a closure (hood) leading edge 26 between the outer surface 22 and the inner surface 24.

The headlamp assembly 12 includes a housing 28 having mounting flanges 30 for mounting the headlamp assembly 12 to the vehicle 10. The housing 28 also includes a closeout mounting flange 32, with closeout fastener holes 34. A translucent headlamp lens 36 is mounted to the housing 28 and is part of the headlamp assembly 12. The lens 36 includes a forward portion 38 through which light shines, a rearward portion 40 used to secure the lens 36 to the housing 28, and an upper edge 42 between the forward portion 38 and rearward portion 40 that defines a gap 44 between the upper edge 42 and hood leading edge 26 when the hood 20 is in its closed position (see FIG. 4). This gap 44 is a fore-aft gap, as opposed to a vertical gap where the hood 20 would shingle over top of a portion of the forward portion 38 of the lens. The upper edge 42 is preferably not a shark fin type of edge in order to improve the appearance of the headlamp to hood interface. The lens 36 may also include one or more closeout locating features 46 extending from an aft side 48 of the rearward portion 40 of the lens 36. A glue joint 49 may be located between the lens 36 and the housing 28.

The headlamp assembly 12 also includes a headlamp closeout 50. The closeout 50 may be made of a closed-cell, low durometer thermoplastic elastomer, or other suitable elastic material that can withstand the environment in which an automotive vehicle operates and spring back to its original shape after being deformed. The closeout 50 includes a closeout base 52 that mounts on the closeout mounting flange 32 of the lamp housing 28. The base 52 may engage the closeout locating feature 46 to help properly locate and orient the closeout 50 relative to the lens 36. Fasteners 54, such as screws or studs, may be received into base mounting holes 56, which may be oversized, that align with corresponding closeout fastener holes 34 in the housing 28. The fasteners 54 secure the closeout 50 to the housing 28. Alternatively, adhesives may be employed instead of or in addition to the fasteners 54, but this may not be as desirable of an option.

The closeout 50 also includes a closeout wall 58 extending out from the closeout base 52. The closeout wall 58 has a lower wall portion 60 and an upper wall portion 62, with the lower wall portion 60 extending between the base 52 and upper wall portion 62. The lower wall portion 60 may extend away from the base 52 at an angle 64 (in a nominal position) other than normal, and may be oriented at an upper-to-lower wall angle 66 (in a nominal position) that is other than one hundred eighty degrees. A hood contact flange 68 extends from the upper wall portion 62 at a contact flange-to-upper wall angle 70 that causes a contact surface 72 of the hood contact flange 68 to extend parallel to the hood inner surface 24 when the hood 20 is in its nominal position. The contact flange-to-upper wall angle 70 may be other than normal.

A visible lip 74 may extend from a free end 76 of the contact flange 68 into the gap 44 between the lens 36 and hood leading edge 26. The visible lip 74 may be located slightly below a surface defined by the lens 36 and the hood outer surface 22 in its nominal closed position. This allows for closing a visual sight line gap between the lens 36 and hood 20 while minimizing concerns with wax and dirt build-up on the visible lip 74. The visible lip 74 may be spaced from the hood leading edge 26 in its nominal position in order to allow for fore-aft build variation in locating the hood 20 when assembled to the vehicle 10. The contact surface 72 is wide enough that the hood 20 will rest over this surface, even when the hood 20 is at its most rearward location of build variation.

The closeout also may include a set of front support ribs 80 and a set of rear support ribs 82. The front support ribs 80 extend from a forward surface 84 of the closeout wall 58, between the base 52 and the contact flange 68. They are preferably relatively thin in order to allow them to support the wall 58, yet buckle when the hood 20 over-travels and compresses the closeout 50 (see FIG. 5). The front support ribs 80 may be spaced, for example, about twenty-five to forty millimeters apart along the forward surface 84 of the closeout wall 58. The rear support ribs 82 extend from a rear surface 86 of the lower wall portion 60, between the base 52 and the upper wall portion 62. These ribs 82 are also preferably relatively thin in order to allow them to support the wall 58, yet buckle when the hood 20 over-travels and compresses the closeout 50.

The interaction of the closeout 50 relative to the hood 20 will now be discussed. FIG. 4 shows the hood 20 in its nominal closed position, with the inner surface 24 resting on the contact surface 72 of the hood contact flange 68. The hood contact flange 68 and visible lip 74 fill the visual sight line of the fore-aft gap 44 between the upper edge 42 of the lens 36 and the hood leading edge 26. One will note that the hood contact flange 68 is wide enough to allow for build variations that may cause the hood leading edge 26 to be somewhat forward or somewhat aft of its nominal position. Also, the visible lip 74 is slightly below a surface defined by the hood outer surface 22 and lens forward portion 38 in order to minimize the risk of wax and dirt buildup on the closeout 50.

FIG. 5 shows the hood 20 in an over-travel position. In this position, the closeout 50 has collapsed elastically. One will note that the hood leading edge 26 is far enough from the headlamp assembly 12 to allow for build variation without a concern of the hood contacting the headlamp assembly 12 or inducing undesirable loads in the headlamp lens 36 during hood over-travel. The lower wall portion 60 and upper wall portion 62—being angled relative to the base 52, the contact flange 68 and each other—will tend to bend where these elements intersect, thus folding onto themselves somewhat. They may also experience some buckling. The front support ribs 80 and rear support ribs 82 are designed to be thin enough to buckle. With the bending and buckling of the generally vertically oriented closeout wall, along with the buckling of the vertically oriented front and rear support ribs 80, 82, the load induced by the hood 20 over-traveling on the closeout 50 is directed into the headlamp housing 28 through the closeout base 52. It is preferred to have these loads directed into the housing 28 rather than into the headlamp lens 36, as is the case with the prior art closeout discussed above. When the hood 20 returns to its nominal position, the closeout 50 will spring back to its nominal position as well.

Additionally, since the loads due to hood over-travel are directed into the housing 28, the closeout 50 may perform another function. The closeout 50 may absorb some of the energy induced by the hood over-travel. The amount of energy absorbed may be effected by adjusting the closeout material durometer, the thickness of the wall portions 60, 62, the thickness of the support ribs 80, 82, and the angles 64, 66. Thus, the closeout 50 may also serve as a secondary hood bumper. The energy absorption may also provide a significant advantage in controlling the amount of hood over-travel, allowing for improved packaging efficiency of the lens-to-housing interface.

While certain embodiments of the present invention have been described in detail, those familiar with the art to which this invention relates will recognize various alternative designs and embodiments for practicing the invention as defined by the following claims.

What is claimed is:

1. A collapsible closeout for a vehicle headlamp assembly having a lamp housing mounted adjacent to a leading edge of a hood, the collapsible closeout comprising:
   a base configured to be mounted to the lamp housing under the hood;
   a closeout wall extending upward from the base and configured to be elastically collapsible upon contact of the hood with the collapsible closeout; and
   a closeout contact flange having a fixed end support by the closeout wall, an opposed free end configured to extend away from the hood toward a gap between the headlamp, assembly and the hood, and a contact surface extending between the fixed end and the free end and configured to extend parallel to and adjacent with an inner surface of the hood when the hood is in a closed position.

2. The collapsible closeout of claim 1 including a first support rib extending between the base and the closeout contact flange, and extending outward from the closeout wall to thereby support the upward extending closeout wall, the first support rib configured to extend toward the vehicle headlamp assembly.

3. The collapsible closeout of claim 2 including a second support rib extending between the base and the closeout wall, and extending outward from the closeout wall in an opposed direction from the first support rib.

4. The collapsible closeout of claim 1 including a first support rib extending between the base and the closeout wall, and configured to extend outward from the closeout wall away from the vehicle headlamp assembly.

5. The collapsible closeout of claim 1 including a fastener mounted to the base and configured to mount to the lamp housing.

6. The collapsible closeout of claim 1 wherein the free end has a lip extending therefrom that is configured to extend into the gap between the lamp assembly and the leading edge of the hood.

7. The collapsible closeout of claim 1 wherein the closeout wall includes a lower wall portion extending from the base at an angle other than normal to the base, and an upper wall portion extending between the lower wall portion and the closeout contact flange, the upper wall portion extending in a first direction that is not parallel to a second direction the lower wall portion extends.

8. The collapsible closeout of claim 1 wherein the collapsible closeout is made of a closed-cell, low durometer thermoplastic elastomer.

9. A collapsible closeout for a vehicle headlamp assembly having a lamp housing, the collapsible closeout comprising:
   a base configured to be mounted to the lamp housing;
   an elastically flexible closeout wall having a lower wall portion extending upward from the base at an angle other than normal to the base and an upper wall portion extending in a first direction that is not parallel to a second direction the lower wall portion extends; and
   a closeout contact flange having a fixed end supported by the upper wall portion, an opposed free end configured to extend away from a hood toward the headlamp assembly, and a contact surface extending between the fixed end and the free end and configured to extend parallel to and adjacent with an inner surface of the hood when the hood is in a closed position.

10. The collapsible closeout of claim 9 including a first support rib extending between the base and the closeout contact flange, and configured to extend outward from the closeout wall toward the vehicle headlamp assembly.

11. The collapsible closeout of claim 10 including a second support rib extending between the base and the lower portion of the closeout wall, and extending outward from the closeout wall in an opposed direction from the first support rib.

12. The collapsible closeout of claim 9 including a first support rib extending between the base and the lower portion of the closeout wall, and configured to extend outward from the closeout wall away from the vehicle lamp assembly.

13. The collapsible closeout of claim 9 including a fastener mounted to the base and adapted to mount to the lamp housing.

14. The collapsible closeout of claim 9 wherein the free end has a lip extending therefrom that is configured to extend between the lamp assembly and a leading edge of the hood.

15. The collapsible closeout of claim 9 wherein the collapsible closeout is made of a closed-cell, low durometer thermoplastic elastomer.

16. A headlamp assembly for a vehicle having a hood with a leading edge comprising:
   a headlamp housing having a closeout mounting flange;
   a headlamp lens mounted to the headlamp housing and having a forward portion, a rearward portion and an upper edge between the forward portion and the rearward portion, the upper edge and the leading edge of the hood defining a fore-aft gap therebetween; and
   a closeout including a base mounted to the closeout mounting flange; an elastically flexible closeout wall extending upward from the base; a hood contact flange having a fixed end supported by the closeout wall, an opposed free end extending away from the hood toward the lamp assembly, and a contact surface extending between the fixed end and the free end and parallel to and adjacent with an inner surface of the hood when the hood is in a closed position; and a plurality of rear support ribs extending between the base and the closeout wall, and supportably extending outward from the closeout wall away from the headlamp lens, whereby the rear support ribs support the upwardly extending closeout wall when the closeout wall is in an uncompressed position.

17. The headlamp assembly of claim 16 wherein the closeout mounting flange includes a mounting hole and the base includes a fastener extending therefrom that operatively engages the mounting hole.

18. The headlamp assembly of claim 16 wherein the headlamp lens includes a closeout locating feature extending from the rearward portion and operatively engaging the base of the closeout.

19. The headlamp assembly of claim 16 wherein the closeout wall includes a lower wall portion extending from the base and an upper wall portion extending between the lower wall portion and the hood contact flange, the upper wall portion extending in a first direction that is not parallel to a second direction the lower wall portion extends.

20. The headlamp assembly of claim 16 wherein the closeout includes a forward support rib extending between the base and the hood contact flange, and supportably extending outward from the closeout wall toward the rearward portion of the headlamp lens, whereby the forward support ribs support the upwardly extending closeout wall when the closeout wall is in the uncompressed position.

* * * * *